(12) United States Patent
Lynch et al.

(10) Patent No.: US 10,672,407 B2
(45) Date of Patent: *Jun. 2, 2020

(54) DISTRIBUTED AUDIENCE MEASUREMENT SYSTEMS AND METHODS

(71) Applicant: The Nielsen Company (US), LLC, New York, NY (US)

(72) Inventors: Wendell Lynch, East Lansing, MI (US); Alan Neuhauser, Silver Spring, MD (US); Taymoor Arshi, Potomac, MD (US); Anand Jain, Ellicott City, MD (US)

(73) Assignee: The Nielsen Company (US), LLC, New York, NY (US)

( * ) Notice: Subject to any disclaimer, the term of this patent is extended or adjusted under 35 U.S.C. 154(b) by 909 days.

This patent is subject to a terminal disclaimer.

(21) Appl. No.: 15/216,077

(22) Filed: Jul. 21, 2016

(65) Prior Publication Data

US 2016/0329058 A1  Nov. 10, 2016

Related U.S. Application Data

(63) Continuation of application No. 14/628,533, filed on Feb. 23, 2015, now Pat. No. 9,437,214, which is a
(Continued)

(51) Int. Cl.
*H04H 60/58* (2008.01)
*G10L 19/018* (2013.01)
(Continued)

(52) U.S. Cl.
CPC ........ *G10L 19/018* (2013.01); *G06Q 30/0204* (2013.01); *G10L 25/48* (2013.01);
(Continued)

(58) Field of Classification Search
None
See application file for complete search history.

(56) References Cited

U.S. PATENT DOCUMENTS

| 4,534,056 A | * | 8/1985 | Feilchenfeld | ........... | G10L 17/00 |
| | | | | | 704/272 |
| 5,333,236 A | * | 7/1994 | Bahl | ...................... | G10L 19/06 |
| | | | | | 704/256.4 |

(Continued)

OTHER PUBLICATIONS

Cano et al., "A Review of Algorithms for Audio Fingerprinting," Multimedia Signal Processing, 2002 IEEE Workshop, IEEE, 2002. pp. 169-173. DOI: 10.1109/MMSP.2002.1203274, 5 pages.
(Continued)

*Primary Examiner* — Kamran Afshar
*Assistant Examiner* — Benjamin J Buss
(74) *Attorney, Agent, or Firm* — Hanley, Flight & Zimmerman, LLC (57) ABSTRACT

Systems and methods are disclosed for customizing, distributing and processing audio fingerprint data. An example method includes receiving, at a first device, an activation signal and a first audio fingerprint via first wireless communications between the first device and a communications network, the receiving occurring while the first device is not recording audio via a microphone of the first device; based on the activation signal, recording audio using the microphone during a first time period; generating a second audio fingerprint representative of the recorded audio; determining whether the second audio fingerprint matches the first audio fingerprint; and sending an indication of whether the second audio fingerprint matches the first audio fingerprint to an audience measurement entity via second wireless communications between the first device and the communications network.

25 Claims, 5 Drawing Sheets

Related U.S. Application Data continuation of application No. 12/609,204, filed on Oct. 30, 2009, now Pat. No. 8,990,142.

(51) Int. Cl.
*G06Q 30/02* (2012.01)
*G10L 25/48* (2013.01)
*G10L 25/81* (2013.01)
*G10L 25/51* (2013.01)
*G10L 25/72* (2013.01)

(52) U.S. Cl.
CPC .............. *G10L 25/51* (2013.01); *G10L 25/72* (2013.01); *G10L 25/81* (2013.01); *H04H 60/58* (2013.01)

(56) References Cited

U.S. PATENT DOCUMENTS

| | | | |
|---|---|---|---|
| 5,437,050 A * | 7/1995 | Lamb | H04H 20/14 |
| | | | 382/191 |
| 7,043,473 B1 * | 5/2006 | Rassool | G06F 16/683 |
| 7,284,255 B1 | 10/2007 | Apel et al. | |
| 7,587,732 B2 | 9/2009 | Wright et al. | |
| 7,783,489 B2 | 8/2010 | Kenyon et al. | |
| 8,108,895 B2 | 1/2012 | Anderson et al. | |
| 8,225,342 B2 | 7/2012 | Mears et al. | |
| 8,990,142 B2 | 3/2015 | Lynch et al. | |
| 2002/0087987 A1 * | 7/2002 | Dudkiewicz | G06F 16/78 |
| | | | 725/46 |
| 2002/0101997 A1 | 8/2002 | Curtis et al. | |
| 2002/0114299 A1 * | 8/2002 | Lu | H04H 60/37 |
| | | | 370/336 |
| 2002/0120929 A1 * | 8/2002 | Schwalb | G06F 16/78 |
| | | | 725/32 |
| 2002/0144261 A1 * | 10/2002 | Schwalb | H04N 7/16 |
| | | | 725/32 |
| 2003/0016834 A1 | 1/2003 | Blanco et al. | |
| 2003/0097657 A1 | 5/2003 | Zhou et al. | |
| 2004/0002310 A1 * | 1/2004 | Herley | G06F 16/639 |
| | | | 707/E17.009 |
| 2004/0064319 A1 * | 4/2004 | Neuhauser | G10L 19/018 |
| | | | 704/273 |
| 2004/0133657 A1 | 7/2004 | Smith et al. | |
| 2004/0158865 A1 * | 8/2004 | Kubler | H04H 60/45 |
| | | | 725/82 |
| 2004/0254790 A1 * | 12/2004 | Novak | G10L 15/08 |
| | | | 704/240 |
| 2004/0266489 A1 | 12/2004 | Chipchase et al. | |
| 2005/0038749 A1 | 2/2005 | Fitch et al. | |
| 2005/0096034 A1 | 5/2005 | Petermann | |
| 2006/0031107 A1 * | 2/2006 | Aihara | G06Q 10/04 |
| | | | 705/7.28 |
| 2006/0181605 A1 * | 8/2006 | Boncyk | G06K 9/228 |
| | | | 348/14.01 |
| 2006/0287915 A1 * | 12/2006 | Boulet | H04N 21/4756 |
| | | | 725/35 |
| 2007/0011040 A1 | 1/2007 | Wright et al. | |
| 2007/0030984 A1 | 2/2007 | Gotfried | |
| 2007/0220103 A1 * | 9/2007 | Rogers | H04M 3/4211 |
| | | | 709/217 |
| 2007/0288277 A1 * | 12/2007 | Neuhauser | H04B 1/3833 |
| | | | 705/7.29 |
| 2008/0015820 A1 | 1/2008 | Kolessar et al. | |
| 2008/0031433 A1 | 2/2008 | Sapp et al. | |
| 2008/0086304 A1 | 4/2008 | Neuhauser | |
| 2008/0306804 A1 | 12/2008 | Opdycke et al. | |
| 2009/0030780 A1 | 1/2009 | York et al. | |
| 2009/0094640 A1 | 4/2009 | Anderson et al. | |
| 2009/0106084 A1 | 4/2009 | Or | |
| 2009/0144144 A1 * | 6/2009 | Grouf | G06F 21/10 |
| | | | 706/52 |
| 2009/0150405 A1 | 6/2009 | Grouf et al. | |
| 2009/0217315 A1 * | 8/2009 | Malik | G06K 9/00624 |
| | | | 725/9 |
| 2009/0260027 A1 | 10/2009 | Weinblatt | |
| 2010/0083299 A1 * | 4/2010 | Nelson | G06N 5/048 |
| | | | 725/19 |
| 2010/0138298 A1 | 6/2010 | Fitzgerald et al. | |
| 2010/0280641 A1 | 11/2010 | Harkness et al. | |
| 2011/0106587 A1 | 5/2011 | Lynch et al. | |
| 2015/0170673 A1 | 6/2015 | Lynch et al. | |

OTHER PUBLICATIONS

Fink et al., "Social- and Interactive-Television Applications Based on Real-Time Ambient-Audio Identification," Google Inc. 2006, 10 pages.

Kennedy, "A Bewilderment of Meters," Admap, Nov. 2006, 4 pages.

Nakutis, "Electronic Audience Monitoring: Methods and Problems," 2008, pp. 20-26, 7 pages.

United States Patent and Trademark Office, "Non-Final Office Action," issued in connection with U.S. Appl. No. 12/609,204, dated Aug. 30, 2013, 55 pages.

United States Patent and Trademark Office, "Final Office Action," issued in connection with U.S. Appl. No. 12/609,204, dated Jun. 20, 2014, 100 pages.

United States Patent and Trademark Office, "Notice of Allowance," issued in connection with U.S. Appl. No. 12/609,204, dated Nov. 19, 2014, 88 pages.

United States Patent and Trademark Office, "Non-Final Office Action," issued in connection with U.S. Appl. No. 14/628,533, dated Jul. 8, 2015, 78 pages.

United States Patent and Trademark Office, "Final Office Action," issued in connection with U.S. Appl. No. 14/628,533, dated Feb. 4, 2016, 10 pages.

United States Patent and Trademark Office, "Notice of Allowance," issued in connection with U.S. Appl. No. 14/628,533, dated May 5, 2016, 201 pages.

* cited by examiner

DISTRIBUTED AUDIENCE MEASUREMENT SYSTEMS AND METHODS

RELATED APPLICATIONS

This patent arises from a continuation of U.S. patent application Ser. No. 14/628,533, filed on Feb. 23, 2015 (now U.S. Pat. No. 9,437,214), which is a continuation of U.S. patent application Ser. No. 12/609,204, filed Oct. 30, 2009 (now U.S. Pat. No. 8,990,142). The entireties of U.S. patent application Ser. Nos. 14/628,533 and 12/609,204 are incorporated herein by reference.

TECHNICAL FIELD

The present disclosure relates to systems and processes for identifying audio and audio-visual (A/V) content, and for optimizing audio fingerprint or signature recognition systems.

BACKGROUND INFORMATION

Audio fingerprinting is premised upon the ability to link unlabeled/unencoded audio to corresponding metadata to determine information such as song artist, or song name. Audio fingerprinting is known for providing such information regardless of an audio format that is being used. Generally speaking, audio fingerprinting systems are content-based audio identification system that extract acoustically relevant characteristics of a portion of audio content (i.e., fingerprint, signature, etc.), and store it in a central database. When presented with unlabeled audio, its fingerprint is calculated and matched against those stored in the central database. Using the fingerprints and matching algorithms, even distorted versions of a single recording can be identified as the same music title. Other terms for audio fingerprinting are robust matching, robust or perceptual hashing, passive watermarking, automatic music recognition, content-based audio signatures and content-based audio identification. Areas relevant to audio fingerprinting include information retrieval, pattern matching, signal processing, databases, cryptography and audio cognition, among others.

Audio fingerprinting may be distinguished from other systems used for identifying audio content, such as audio watermarking. In audio watermarking (or encoded signature recognition), analysis on psychoacoustic properties of the audio signal must be conducted so that ancillary data representing a message (or watermark) can be embedded in audio without altering the human perception of sound. The identification of data relating to the audio is accomplished by extracting the message embedded in the audio. In audio fingerprinting, the message is automatically derived from the perceptually most relevant components of sound in the audio.

Audio fingerprinting has numerous advantages, one of which is that the fingerprinting may be used to identify legacy content, i.e., unencoded content. In addition, fingerprinting requires no modification of the audio content itself during transmission. As a drawback however, the computational complexity of fingerprinting is generally higher than watermarking, and there is a need to connect each device to a fingerprint repository for performing substantial fingerprint processing.

Accordingly, there is a need in the art to simplify the processing of audio fingerprint recognition. Additionally, there is a need to decentralize the process of fingerprint recognition, and provide efficient distribution of fingerprint recognition, particularly for large-scale systems.

SUMMARY

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The terms "media data" and "media" as used herein mean data which is accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, text, images, animations, databases, datasets, files, broadcasts, displays (including but not limited to video displays, posters and billboards), signs, signals, web pages and streaming media data.

The term "database" as used herein means an organized body of related data, regardless of the manner in which the data or the organized body thereof is represented. For example, the organized body of related data may be in the form of a table, a map, a grid, a packet, a datagram, a file, a document, a list or in any other form.

The term "dataset" as used herein means a set of data, whether its elements vary from time to time or are invariant, whether existing in whole or in part in one or more locations, describing or representing a description of, activities and/or attributes of a person or a group of persons, such as a household of persons, or other group of persons, and/or other data describing or characterizing such a person or group of persons, regardless of the form of the data or the manner in which it is organized or collected.

The term "correlate" as used herein means a process of ascertaining a relationship between or among data, including but not limited to an identity relationship, a correspondence or other relationship of such data to further data, inclusion in a dataset, exclusion from a dataset, a predefined mathematical relationship between or among the data and/or to further data, and the existence of a common aspect between or among the data.

The term "network" as used herein includes both networks and internetworks of all kinds, including the Internet, and is not limited to any particular network or inter-network.

The terms "first", "second", "primary" and "secondary" are used to distinguish one element, set, data, object, step, process, activity or thing from another, and are not used to designate relative position or arrangement in time, unless otherwise stated explicitly.

The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," "communicating" and "communication" as used herein include both conveying data from a source to a destination, and delivering data to a communications medium, system, channel, device or link to be conveyed to a destination.

The term "processor" as used herein means processing devices, apparatus, programs, circuits, components, systems and subsystems, whether implemented in hardware, software or both, whether or not programmable and regardless of the form of data processed, and whether or not programmable. The term "processor" as used herein includes, but is not limited to computers, hardwired circuits, signal modifying devices and systems, devices and machines for controlling systems, central processing units, programmable devices, state machines, virtual machines and combinations of any of the foregoing.

The terms "storage" and "data storage" as used herein mean tangible data storage devices, apparatus, programs, circuits, components, systems, subsystems and storage media serving to retain data, whether on a temporary or permanent basis, and to provide such retained data.

The terms "panelist," "respondent" and "participant" are interchangeably used herein to refer to a person who is, knowingly or unknowingly, participating in a study to gather information, whether by electronic, survey or other means, about that person's activity.

The term "attribute" as used herein pertaining to a household member shall mean demographic characteristics, personal status data and/or data concerning personal activities, including, but not limited to, gender, income, marital status, employment status, race, religion, political affiliation, transportation usage, hobbies, interests, recreational activities, social activities, market activities, media activities, Internet and computer usage activities, and shopping habits.

The present disclosure illustrates a decentralized audio fingerprint recognition system and method, where audio matching of fingerprints for specific media or media data is performed on a portable device using a customized algorithm, while having a priori knowledge of fingerprints (signatures). By distributing fingerprint matching to the portable devices, the matching process for audio data may be more efficiently tailored for specific applications, where additional benefits of scalability for large numbers of devices may be realized.

DETAILED DESCRIPTION

Figure 1:
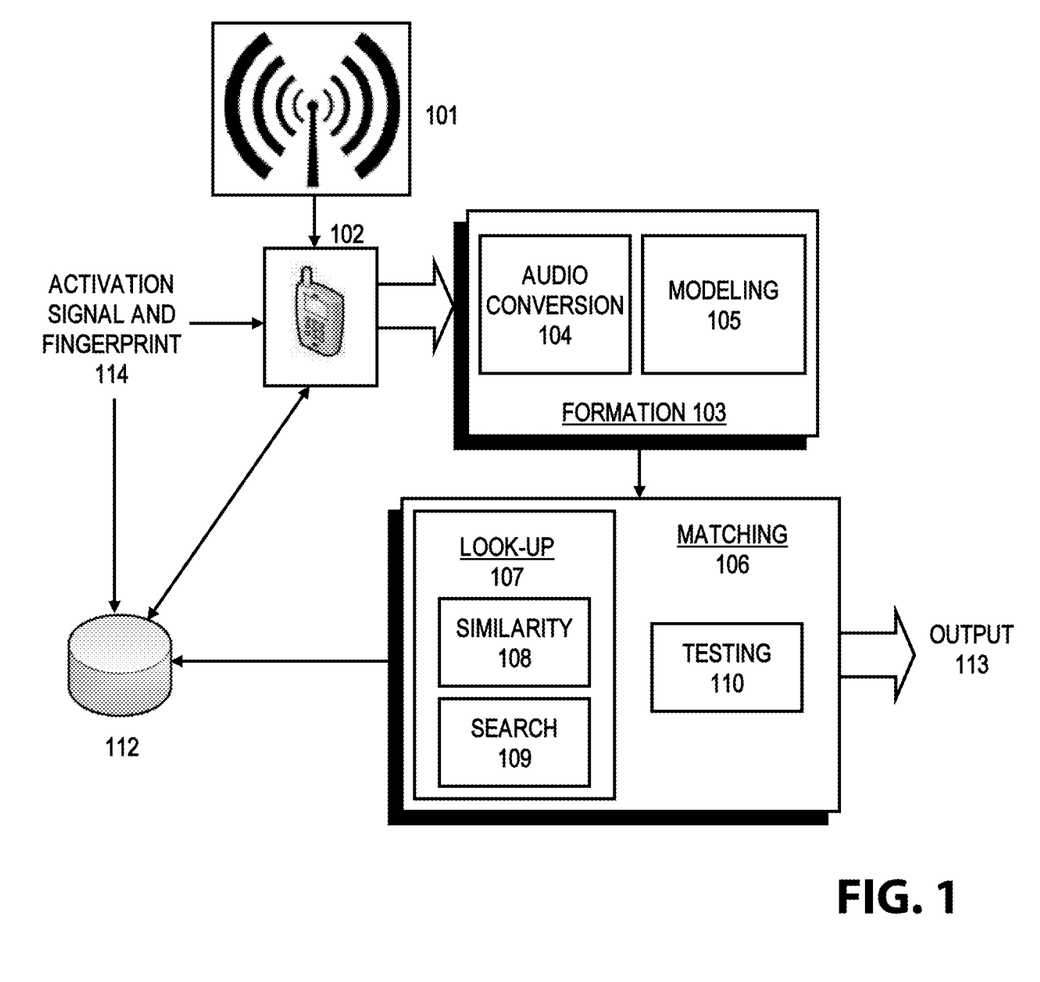
FIG. 1 is a block diagram illustrating an exemplary system for extracting and matching audio fingerprints.

FIG. 1 illustrates an example system for audio fingerprint extraction and matching for a media source 101 that communicates audio to one or more portable devices 102. Portable device 102 may be a cell phone, Personal Digital Assistant (PDA), media player/reader, computer laptop, tablet PC, or any other processor-based device that is known in the art, including a desktop PC and computer workstation. During operation, portable device 102 receives an activation signal 114 and a fingerprint for known audio content. Upon receiving the activation signal 114, portable device 102 becomes operative to sample room audio for a period of time specified by the activation signal. In some examples, the samples are obtained through a microphone (not shown) coupled to the portable device 102. Preferably, the activation signal 114 is tailored so that the period of time of activation corresponds to the length of the known media content.

As an example, known media content may comprise a 20-second commercial. Typically, when commercials are communicated or transmitted, they are scheduled for set times during a programmers' normal content. If these times are known or estimated, an activation signal may be sent to the portable device 102 in advance (e.g., one minute before the commercial is scheduled to air). Activation signal 114 would also accompanied by a pre-recorded fingerprint of the known content, which could be received before, after, or simultaneously with activation signal 114. In the example of FIG. 1, the pre-recorded fingerprint would be stored in memory 112 associated with portable device 102. Activation signal 114 preferably includes executable content which forces portable device 102 to "wake up" if it is inactive, and/or otherwise prepare for sampling ambient audio prior to the scheduled commercial.

Continuing with the example, once the portable device 102 downloads activation signal 114, the device begins sampling ambient sound in regular intervals for a predetermined time prior to the airing of the commercial (e.g., 10 seconds), and continues sampling for a predetermined time after the airing of the commercial (e.g., 10 seconds), for a total sampling time period (10 sec.+20 sec.+10 sec.=40 seconds). Once the total sampling time period expires, portable device 102 stops sampling and records the sampled data in memory 112, and forwards the sampled data to fingerprint formation module 103 of portable device 102.

Fingerprint formation module 103 comprises an audio conversion module 104 and fingerprint modeling module 105. Audio conversion module 104 performs front-end processing on the sampled audio to convert the audio signal into a series of relevant features which are then forwarded to fingerprint modeling module 105. Module 105 performs audio modeling processing to define the final fingerprint representation such as a vector, a trace of vectors, a codebook, a sequence of indexes to Hidden Markov Model (HMM) sound classes, a sequence of error correcting words or musically meaningful high-level attributes. Further details regarding formation module 103 and modeling module 105 are discussed below.

Once the fingerprint is formed, a matching module 106 determines whether a match exists between the signature formed from module 103 and the pre-recorded signature stored in memory 112. Look-up module 107 preferably comprises a similarity portion 108 and a search portion 109. Similarity portion 108 measures characteristics of the fingerprint formed from module 103 against the pre-recorded fingerprint using a variety of techniques. One such technique includes using a correlation metric for comparing vector sequences in the fingerprint. When the vector feature sequences are quantized, a Manhattan distance may be measured. In cases where the vector feature sequence quantization is binary, a Hamming distance may be more appropriate. Other techniques may be appropriate such as a "Nearest Neighbor" classification using a cross-entropy estimation, or an "Exponential Pseudo Norm" (EPN) metric to better distinguish between close and distant values of the fingerprints. Further details these metrics and decoding may be found in U.S. Pat. No. 6,973,574, titled "Recognizer of Audio Content In Digital Signals", filed Apr. 24, 2001, and U.S. Pat. No. 6,963,975, titled "System and Method for Audio Fingerprinting", filed Aug. 10, 2001, both of which are incorporated by reference in its entirety herein.

In some examples, pre-recorded fingerprints may have pre-computed distances established among fingerprints registered in a central repository (not shown). By pre-computing distances among fingerprints registered in the repository, a data structure may be built to reduce or simplify evaluations made from signatures in memory 112 at the portable device end. Alternately, sets of equivalent classes may be pre-recorded for a given fingerprint, and forwarded to memory 112, where the portable device calculates similarities in order to discard certain classes, while performing more in-depth search for the remaining classes.

Once a fingerprint is located from look-up module 107, confirmation module 110 "scores" the match to confirm that a correct identification has occurred. The matching "score" would relate to a threshold that the match would exceed in order to be determined as a "correct" match. The specific threshold would depend on the fingerprint model used, the discriminative information, and the similarity of the fingerprints in the memory 112. In some examples, memory 112 would be loaded with a limited database that would correlate to the fingerprints and/or other data received at the time of activation signal 114. Accordingly, unlike conventional fingerprinting systems, the matching and threshold configurations can be significantly simplified. Once a determination is made from matching module 106, the result (i.e., match/no match) is communicated from output 113 of portable device 102 to a central repository for storage and subsequent analysis.

Figure 2:
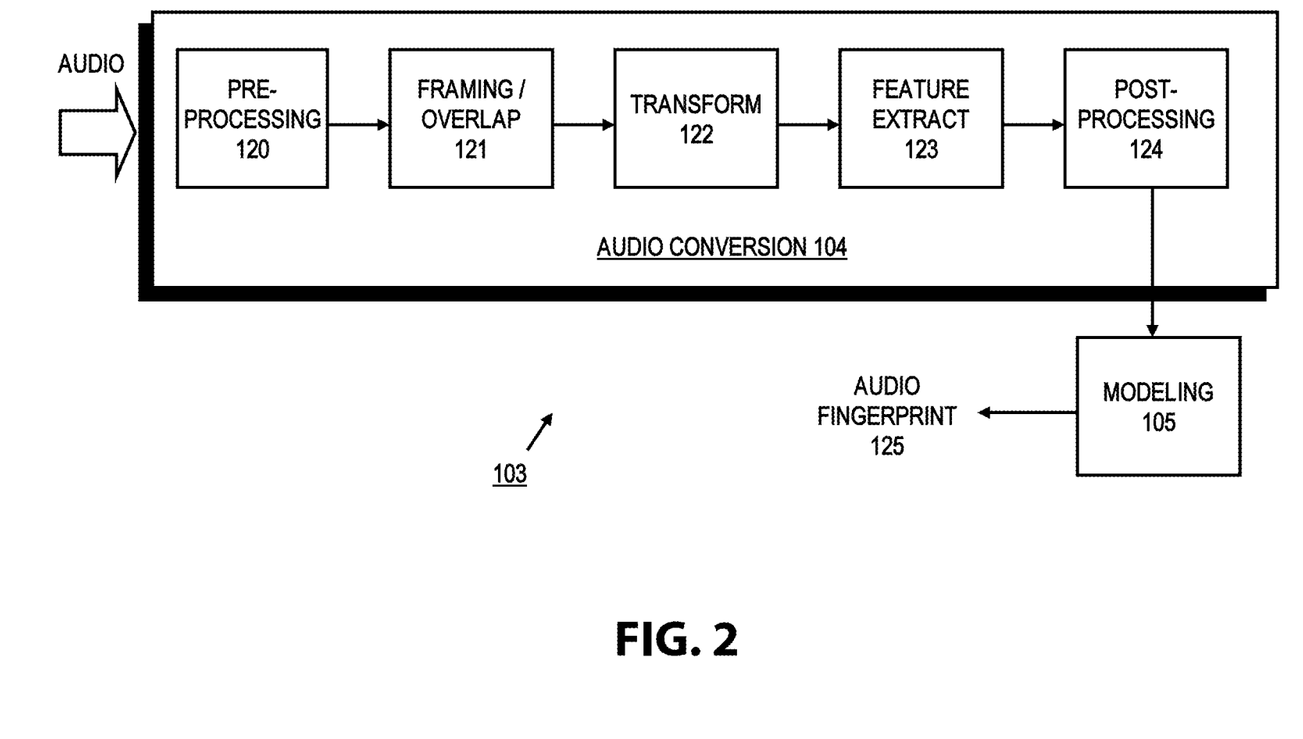
FIG. 2 is a block diagram illustrating an example configuration for generating an audio fingerprint.

Turning to FIG. 2, an example audio conversion module 104 described above in FIG. 1, is illustrated in greater detail. As audio is received in fingerprint formation module 103 after activation, the audio is digitized (if necessary) in pre-processing module 120 and converted to a suitable format, for example, by using pulse-code modulation (PCM), so that where the magnitude of the audio is sampled regularly at uniform intervals (e.g., 5-44.1 KHz), then quantized to a series of symbols in a numeric (binary) code. Additional filtering and normalization may also be performed on the audio as well.

Next, the processed audio is forwarded to framing module 121, where the audio is divided into frames, using a particular frame size (e.g. 10-100 ms), where the number of frames processed are determined according to a specified frame rate. An overlap function should also be applied to the frames to establish robustness of the frames in light of shifting for cases where the input audio data is not properly aligned to the original audio used for generating the fingerprint.

The transform module 122 of FIG. 2 then performs a further signal processing on the audio to transform audio data from the time domain to the frequency domain to create new data point features for further processing. One particularly suited transform function is the Fast Fourier Transform (FFT) which is performed periodically with or without temporal overlap to produce successive frequency bins each having a frequency width. Other techniques are available for segregating the frequency components of the audio signals, such as a wavelet transform, discrete Walsh Hadamard transform, discrete Hadamard transform, discrete cosine transform (DCT), Modulated Complex transform (MCLT) as well as various digital filtering techniques.

Once transformed, the audio data undergoes feature extraction 123 in order to generate the final acoustic vectors for the audio fingerprint. Further details of feature extraction module 123 will be discussed below in connection with FIG. 3. Once features are extracted, post-processing 124 may be performed on the audio data to provide quantization and normalization and to reduce distortions in the audio. Suitable post-processing techniques include Cepstrum Mean Normalization (CMN), mean subtraction and component-wise variance normalization. Oncepost-processing is completed, the audio data undergoes modeling 105, discussed above in connection with FIG. 1 and generates an audio fingerprint 125 that will subsequently be used for matching.

Figure 3:
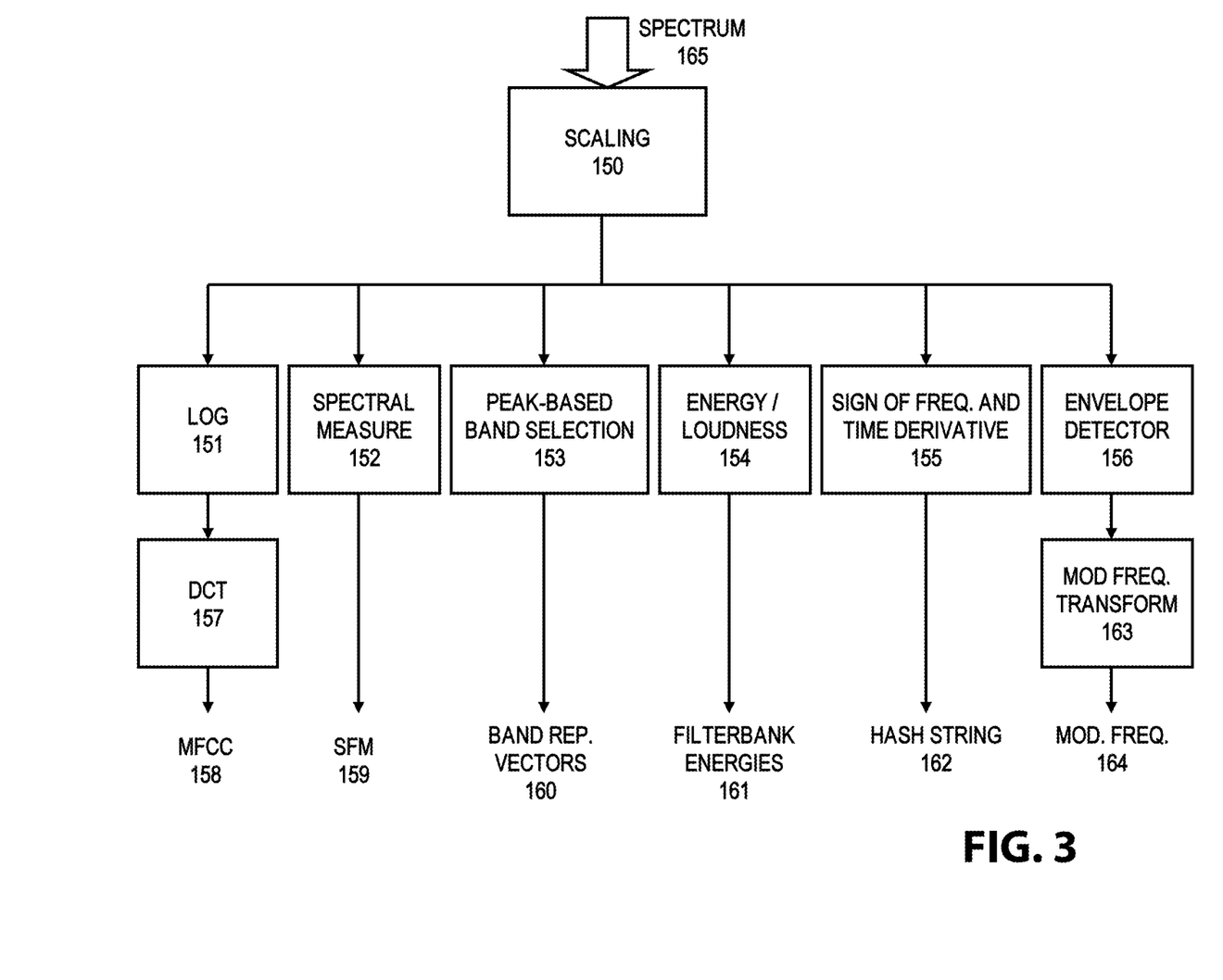
FIG. 3 is a block diagram illustrating an example configuration for extracting features from an audio fingerprint.

FIG. 3 illustrates example feature extraction models for module 123. As a practical matter, only a single model is selected at a given time, where the type feature extraction is dependent upon the type of audio conversion being performed in module 104. Regardless of the type used, the feature extraction should be optimized to reduce the dimensionality and audio variance attributable to distortion. After undergoing transformation (e.g., FFT) from transform module 122, the audio spectrum scale bands are processed in module 150. One option shown in FIG. 3 involves mel-frequency cepstrum (MFC), which is a representation of the short-term power spectrum of a sound, based on a linear cosine transform of a log power spectrum on a nonlinear mel scale of frequency. Mel-frequency cepstral coefficients (MFCCs) are coefficients that collectively make up an MFC. They are derived from a type of cepstral representation of the audio clip (a nonlinear "spectrum-of-a-spectrum"). As shown in FIG. 3, the MFCCs would be derived by taking the FFT of the signal and mapping the powers of the spectrum obtained above onto the mel scale, using overlapping windows (150). Next, the logs (151) of the powers at each of the mel frequencies are recorded, and a DCT of the list log powers is taken to obtain the MFCCs (158) representing the amplitudes of the resulting spectrum.

Another option involves the use of spectral flatness measure (SFM) to digitally process signals to characterize an audio spectrum. Spectral flatness is measured 152 and calculated by dividing the geometric mean of the power spectrum by the arithmetic mean of the power spectrum. A high spectral flatness (e.g., "1") indicates that the spectrum has a similar amount of power in all spectral bands—this would sound similar to white noise, and the graph of the spectrum would appear relatively flat and smooth. A low spectral flatness (e.g., "0") indicates that the spectral power is concentrated in a relatively small number of bands—this would typically sound like a mixture of sine waves, and the spectrum would appear spiky. A tonality vector could then be generated, where the vector would be the collection of tonality coefficients for a single frame. More specifically, the tonality vector contains a tonality coefficient for each critical band.

Alternately, band representative vectors 160 may be generated from the feature extraction by carrying out peakbased band selection 153. Here, the audio data is represented by vectors containing positions of bands in which significant amplitude peaks take place. Thus, for a particular time frame, significant peaks can be identified for a particular frequency band. Also, filter bank energies 161 may be measured by taking the energy 154 in every band in the filtered spectrum and storing the energy in a vector for each time frame. Also, the sign of the changes of energy differences of adjacent bark-spaced frequency bands and time derivative(s) may be measured 155 to form a hash string 162 for the fingerprint. Yet another technique for feature extraction for the audio fingerprint involves modulation frequency estimation 164. This approach describes the time varying behavior of bark-spaced frequency bands by calculating the envelope 156 of the spectrum for each band over a certain amount of time frames. This way, a modulation frequency 163 can be estimated for each interval. The geometric mean of these frequencies for each band is used to obtain a compact signature of the audio material.

Figure 4:
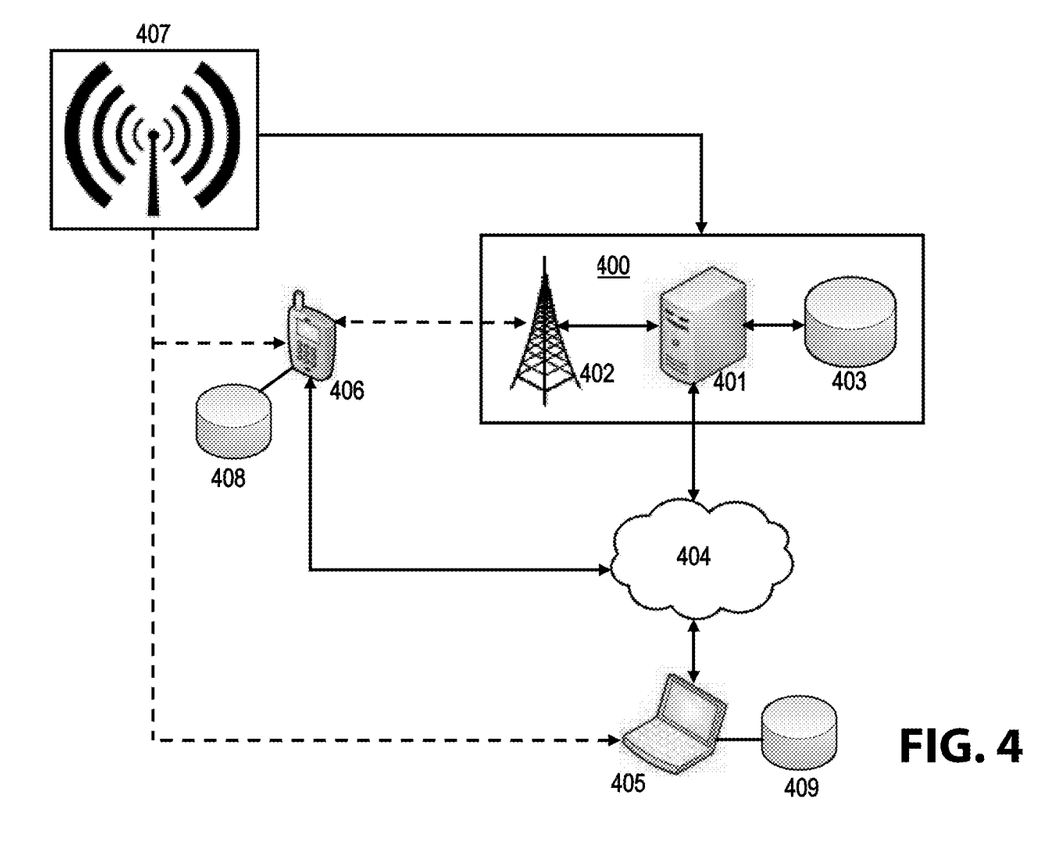
FIG. 4 is a block diagram illustrating an example system for distributing audio fingerprint processing.

FIG. 4 illustrates an example of distributing and collecting fingerprints from portable devices such as a smart phone 406 and laptop 405, both of which have internal memory storages 408 and 409, respectively. Central site 400 comprises one or more servers 401, and a mass storage device 403. Central site 400 also may comprise a wireless transmitter 402 for communicating with portable device 406, as well as other devices (such as laptop 405). Central site is coupled to a network 404, such as the Internet, which in turn couples one or more devices (405, 406) together.

Broadcaster 407 emits an acoustic audio signal that is received at portable device 406 and laptop 405 (shown as dotted arrow in FIG. 4). In some examples, an acoustic signal is received at each device using a microphone that picks up ambient sound for subsequent processing and recording. The broadcast format may be in any known form, including, but not limited to, radio, television and/or computer network-based communication. As discussed above, certain audio items, such as commercials, announcements, pre-recorded songs, etc. are known ahead of time by the broadcaster, and are broadcast according to a certain schedule. Prior to broadcast, one or more audio items undergo processing according to any of the techniques discussed above (see FIGS. 1-3 and related text) to produce an audio fingerprints. Each of the fingerprints are stored in mass storage device 403

In addition to storing audio fingerprints, central site 400 also may store panelist data, household data and datasets that pertain to the owners of the portable devices, especially when the system is being utilized for audience-measurement applications. In some examples, household-level data representing media exposure, media usage and/or consumer behavior may be converted to person-level data, and vice-versa. In some examples, data about panelists is gathered relating to one or more of the following: panelist demographics; exposure to various media including television, radio, outdoor advertising, newspapers and magazines, retail store visits, purchases, internet usage and consumer beliefs and opinions relating to consumer products and services. This list is merely example and other data relating to consumers may also be gathered.

Various datasets may be produced by different organizations, in different manners, at different levels of granularity, regarding different data, pertaining to different timeframes, and so on. Some examples integrate data from different datasets. Some examples convert, transform or otherwise manipulate the data of one or more datasets. In some examples, datasets providing data relating to the behavior of households are converted to data relating to behavior of persons within those households. In some examples, data from datasets are utilized as "targets" and other data utilized as "behavior." In some examples, datasets are structured as one or more relational databases. In some examples, data representative of respondent behavior is weighted.

For each of the examples described herein, datasets are provided from one or more sources. Examples of datasets that may be utilized include the following: datasets produced by Arbitron Inc. (hereinafter "Arbitron") pertaining to broadcast, cable or radio (or any combination thereof); data produced by Arbitron's Portable People Meter System; Arbitron datasets on store and retail activity; the Scarborough retail survey; the JD Power retail survey; issue specific print surveys; average audience print surveys; various competitive datasets produced by TNS-CMR or Monitor Plus (e.g., National and cable TV; Syndication and Spot TV); Print (e.g., magazines, Sunday supplements); Newspaper (weekday, Sunday, FSI); Commercial Execution; TV national; TV local; Print; AirCheck radio dataset; datasets relating to product placement; TAB outdoor advertising datasets; demographic datasets (e.g., from Arbitron; Experian; Axiom, Claritas, Spectra); Internet datasets (e.g., Comscore; NetRatings); car purchase datasets (e.g., JD Power); purchase datasets (e.g., IRI; UPC dictionaries)

Datasets, such as those mentioned above and others, provide data pertaining to individual behavior or provide data pertaining to household behavior. Currently, various types of measurements are collected only at the household level, and other types of measurements are collected at the person level. For example, measurements made by certain electronic devices (e.g., barcode scanners) often only reflect household behavior. Advertising and media exposure, on the other hand, usually are measured at the person level, although sometimes advertising and media exposure are also measured at the household level. When there is a need to cross-analyze a dataset containing person level data and a dataset containing household level data, the existing common practice is to convert the dataset containing person level data into data reflective of the household usage, that is, person data is converted to household data. The datasets are then cross-analyzed. The resultant information reflects household activity.

Currently, databases that provide data pertaining to Internet related activity, such as data that identifies websites visited and other potentially useful information, generally include data at the household level. That is, it is common for a database reflecting Internet activity not to include behavior of individual participants (i.e., persons). Similarly, databases reflective of shopping activity, such as consumer purchases, generally include household data. Examples of such databases are those provided by IRI, HomeScan, NetRatings and Comscore. Additional information and techniques for collecting and correlating panelist and household data may be found in U.S. patent application Ser. No. 12/246,225, titled "Gathering Research Data" and U.S. patent application Ser. No. 12/425,127, titled "Cross-Media Interactivity Metrics", both of which are incorporated by reference in their entirety herein.

Figure 5:
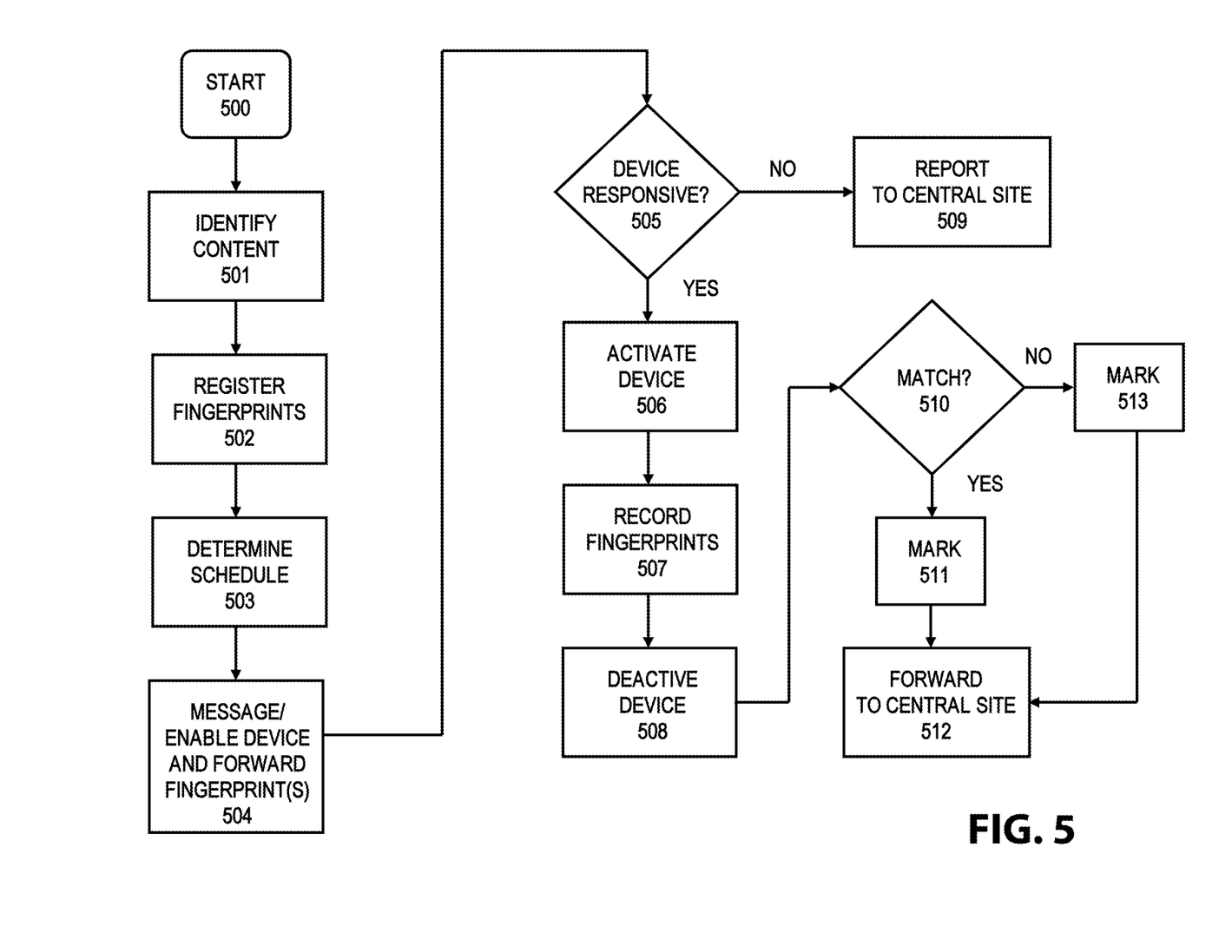
FIG. 5 is an example flowchart illustrating a process for distributing audio fingerprint processing.

Once panelist and/or household data is established, operators of central site 400 may tailor fingerprint distribution to targeted devices (e.g., single males, age 18-24, annual household income exceeding $50K). FIG. 5 illustrates an example in which, at the start of the process 500, audio content is identified 501 and fingerprinted 502 as discussed above. The audio content is then coordinated with the broadcaster to determine a schedule 503 to determine what times the content will be communicated. In other examples, the broadcaster site 407 may have a dedicated connection with central site 400 in order to send an alert message, indicating that the content is about to be communicated.

In addition to identifying audio content, central site 400 would also correlate the content to panelist and/or household data to determine the most effective audience for polling. Once identified, central site 400 messages each portable device associated with the panelist and/or household data 504, where each message comprises an activation signal. Additionally, the activation signal would be accompanied by the pre-recorded audio fingerprint which may be communicated before, after, or simultaneous with the communication of the activation signal. After the message, activation signal and fingerprint are communicated to the devices, an acknowledgement signal is received at the central site, indicating whether the devices received the information, and if the devices were responsive (i.e., the portable device activated in response to the message). If the portable device was unresponsive, this information is communicated back to the central site 509.

Once the portable device is activated 506, the device prepares for reception of the audio content by activating a microphone or other recording device just prior to the actual communication of the audio content, and remain on during the period of time in which the content is communicated, and deactivate at a predetermined time thereafter. During the time in which the audio content is communicated, the portable device records the audio and forms an audio fingerprint as described above. After the audio fingerprint is formed in the portable device, the portable device performs fingerprint matching locally 510. The matching compares the recorded fingerprint against the prerecorded fingerprint received at the time of messaging to see if there is a match 510. If a match 511 or no match 513 result is obtained, the result is marked and forwarded to central site 400 in step 512. The matching result message should preferably contain identification information of the portable device, identification information of the audio content and/or fingerprint, and a message portion that indicates the results of the match. The message portion may simply be a binary "1" indicating that a match has occurred, or a binary "0" indicating that there was no match. Other message formats are also possible and may be specifically tailored for the specific hardware platform being used.

For streaming content, an activation message would be sent to a panel of computers or smart phones causing them to wake up shortly before a specific time to open a particular stream. At this point, the devices would collect audio matching fingerprints to a period spanning the length of the content and determine if there is a match. The information sent back to the central site would then comprise of yes/no decisions for each content analyzed. One advantage of the configurations described above is that it greatly simplifies the design and implementation of the central site, since it no longer would require substantial processing to match fingerprints for a collective group of devices. This in turn provides greater freedom in customizing, distributing and processing audio fingerprint data, and allows for scaling to enormous panel sizes.

Although various examples and/or embodiments of the present invention have been described with reference to a particular arrangement of parts, features and the like, these are not intended to exhaust all possible arrangements or features, and indeed many other examples, embodiments, modifications and/or variations will be ascertainable to those of ordinary skill in the art.

What is claimed is:

1. A method to meter media, the method comprising:
   waking a portable device from an inactive state in response to an activation signal received at the portable device from a central facility, the activation signal including a first fingerprint and
   after waking the portable device from the inactive state:
      storing the first fingerprint included with the activation signal in a memory of the portable device;
      recording audio with the portable device;
      generating, with the portable device, a second fingerprint based on the recorded audio;
      comparing, with the portable device, the first fingerprint to the second fingerprint to generate a match score; and
      communicating, from the portable device to the central facility, a match determination based on the match score.

2. The method as defined in claim 1, wherein the comparing, with the portable device, of the first fingerprint to the second fingerprint to generate the match score further includes determining first characteristics of the first fingerprint and second characteristics of the second fingerprint.

3. The method as defined in claim 2, wherein the comparing, with the portable device, of the first fingerprint to the second fingerprint to generate the match score further includes generating a measurement of a difference between the first characteristics of the first fingerprint and the second characteristics of the second fingerprint.

4. The method as defined in claim 3, wherein the generating of the measurement of the difference between the first characteristics of the first fingerprint and the second characteristics of the second fingerprint includes comparing first vector sequences of the first fingerprint to second vector sequences of the second fingerprint.

5. The method as defined in claim 3, wherein the measurement of the difference is one of a Manhattan distance, a Hamming distance, a Nearest Neighbor classification, or an Exponential Pseudo Norm metric.

6. The method as defined in claim 3, wherein the comparing, with the portable device, of the first fingerprint to the second fingerprint to generate the match score further includes comparing the measurement of the difference to a threshold.

7. The method as defined in claim 6, wherein the comparing, with the portable device, of the first fingerprint to the second fingerprint to generate the match score includes determining a positive match score when the measurement of the difference exceeds the threshold, the positive match score indicating that the first fingerprint matches the second fingerprint, and wherein the match determination is an affirmative result based on the positive match score.

8. The method as a defined in claim 6, wherein the comparing, with the portable device, of the first fingerprint to the second fingerprint to generate the match score includes determining a negative match score when the measurement of the difference is less than the threshold, the negative match score indicating that the first fingerprint is divergent from the second fingerprint, and wherein the match determination is a negative result based on the negative match score.

9. A portable device comprising:
   a communication interface to receive an activation signal from a central facility, the activation signal including a first fingerprint, the activation signal further including executable content to wake the portable device from an inactive state;

a microphone to record an audio sample;
a formation module implemented, at least in part, by at least one processor, the formation module to generate a second fingerprint based on the audio sample after the portable device wakes from the inactive state; and
a confirmation module implemented, at least in part, by the at least one processor, the formation module to, after the portable device wakes from the inactive state:
generate a match score based on the first fingerprint and the second fingerprint, and
generate a match determination based on the match score.

10. The portable device of claim 9, wherein the communication interface is further to communicate the match determination from the portable device to the central facility.

11. The portable device of claim 9, wherein the portable device further includes a look-up module implemented, at least in part, by the at least one processor, the look-up module to determine first characteristics of the first fingerprint and second characteristics of the second fingerprint.

12. The portable device of claim 11, wherein the look-up module is further to generate a measurement of a difference between the first characteristics of the first fingerprint and the second characteristics of the second fingerprint.

13. The portable device of claim 12, wherein to generate the measurement of the difference between the first characteristics of the first fingerprint and the second characteristics of the second fingerprint, the look-up module is further to compare first vector sequences of the first fingerprint to second vector sequences of the second fingerprint.

14. The portable device of claim 12, wherein the measurement of the difference is one of a Manhattan distance, a Hamming distance, a Nearest Neighbor classification, or an Exponential Pseudo Norm metric.

15. The portable device of claim 12, wherein to generate the match score based on the first fingerprint and the second fingerprint, the confirmation module is further to compare the measurement of the difference to a threshold.

16. The portable device of claim 15, wherein to generate the match score based on the first fingerprint and the second fingerprint, the confirmation module is further to determine a positive match score when the measurement of the difference exceeds the threshold, the positive match score indicating that the first fingerprint matches the second fingerprint, and wherein the match determination is an affirmative result based on the match score.

17. The portable device of claim 15, wherein to generate the match score based on the first fingerprint and the second fingerprint, the confirmation module is further to determine a negative match score when the measurement of the difference is less than the threshold, the negative match score indicating that the first fingerprint is divergent from the second fingerprint, and wherein the match determination is a negative result based on the match score.

18. A tangible machine readable storage medium comprising instructions which, when executed by a processor of a portable device, cause the processor to at least:
wake the portable device from an inactive state in response to an activation signal received at the portable device from a central facility, the activation signal including a first fingerprint and
after the portable device wakes from the inactive state:
store the first fingerprint included with the activation signal in a memory of the portable device;
record audio with the portable device;
generate a second fingerprint based on the recorded audio;
compare the first fingerprint to the second fingerprint to generate a match score; and
communicate, from the portable device to the central facility, a match determination based on the match score.

19. The tangible machine readable storage medium as defined in claim 18, wherein the instructions, when executed, cause the processor to determine first characteristics of the first fingerprint and second characteristics of the second fingerprint to compare the first fingerprint to the second fingerprint to generate the match score.

20. The tangible machine readable storage medium as defined in claim 19, wherein the instructions, when executed, cause the processor to generate a measurement of a difference between the first characteristics of the first fingerprint and the second characteristics of the second fingerprint to compare the first fingerprint to the second fingerprint to generate the match score.

21. The tangible machine readable storage medium as defined in claim 20, wherein the instructions, when executed, cause the processor to compare first vector sequences of the first fingerprint to second vector sequences of the second fingerprint to generate the measurement of the difference between the first characteristics of the first fingerprint and the second characteristics of the second fingerprint.

22. The tangible machine readable storage medium as defined in claim 20, wherein the measurement of the difference is one of a Manhattan distance, a Hamming distance, a Nearest Neighbor classification, or an Exponential Pseudo Norm metric.

23. The tangible machine readable storage medium as defined in claim 20, wherein the instructions, when executed, cause the processor to compare the measurement of the difference to a threshold to compare the first fingerprint to the second fingerprint to generate the match score.

24. The tangible machine readable storage medium as defined in claim 23, wherein the instructions, when executed, cause the processor to determine a positive match score when the measurement of the difference exceeds the threshold, the positive match score indicating that the first fingerprint matches the second fingerprint, and wherein the match determination is an affirmative result based on the positive match score.

25. The tangible machine readable storage medium as defined in claim 23, wherein the instructions, when executed, cause the processor to determine a negative match score when the measurement of the difference is less than the threshold, the negative match score indicating that the first fingerprint is divergent from the second fingerprint, and wherein the match determination is a negative result based on the negative match score.

* * * * *